US012116811B2

(12) United States Patent
Moloney

(10) Patent No.: US 12,116,811 B2
(45) Date of Patent: Oct. 15, 2024

(54) LOCKABLE HANDLE ASSEMBLY WITH FLOATING CAM MECHANISM

(71) Applicant: Thomas Moloney Pty Limited, Somersby (AU)

(72) Inventor: Thomas Moloney, Wamberal (AU)

(73) Assignee: Thomas Moloney Pty Limited, Somersby (AU)

(*) Notice: Subject to any disclaimer, the term of this patent is extended or adjusted under 35 U.S.C. 154(b) by 363 days.

(21) Appl. No.: 16/546,811

(22) Filed: Aug. 21, 2019

(65) Prior Publication Data

US 2020/0063471 A1 Feb. 27, 2020

(30) Foreign Application Priority Data

Aug. 23, 2018 (AU) ................................ 2018903093

(51) Int. Cl.
*E05C 3/16* (2006.01)
*E05B 1/00* (2006.01)
(Continued)

(52) U.S. Cl.
CPC .............. *E05C 3/162* (2013.01); *E05B 1/003* (2013.01); *E05B 13/005* (2013.01); *E05C 3/10* (2013.01);
(Continued)

(58) Field of Classification Search
CPC ... E05C 3/00; E05C 3/12; E05C 3/122; E05C 3/16; E05C 3/162; E05C 3/22; E05C 9/00; E05C 9/002; E05C 9/04; E05C 9/041; E05C 9/043; E05C 9/045; E05C 9/10; E05B 13/005; E05B 13/002; E05B 13/004; E05B 13/101; E05B 83/28; E05B 83/30; E05B 83/32; E05B 65/52; E05B 65/5207; E05B 65/5215; E05B 65/523; E05B 63/0056; E05B 63/0043; E05B 5/00; E05B 5/003; E05B 5/006; E05B 13/00; E05B 13/10; Y10T 292/0834; Y10T 292/0836;
(Continued)

(56) References Cited

U.S. PATENT DOCUMENTS 4,676,083 A * 6/1987 Sedley ................ E05B 47/0043 70/222
4,989,907 A * 2/1991 Edmonds ................ E05C 3/162 292/DIG. 31
(Continued)

FOREIGN PATENT DOCUMENTS

EP 1113130 A1 * 7/2001 ........... E05B 47/068
EP 2653638 A1 * 10/2013 ............. E05B 83/30
WO WO2013105942 7/2013

*Primary Examiner* — Christine M Mills
*Assistant Examiner* — Peter H Watson
(74) *Attorney, Agent, or Firm* — McHale & Slavin, P.A.

(57) ABSTRACT

A handle assembly with a body and a handle is disclosed. The handle is rotatably mounted to the body and operatively connected to a cam so that rotation of the handle causes corresponding rotation of the cam. The cam is movable between an activated position and a deactivated position, so that when the cam is in the activated position rotation of the handle causes the cam to rotate and engage a retention device, and when the cam is in the deactivated position rotation of the handle causes the cam to rotate without engaging the retention device. A drawer or door with a handle assembly is also disclosed.

13 Claims, 4 Drawing Sheets

(51) Int. Cl.

| | |
|---|---|
| ***E05B 13/00*** | (2006.01) |
| ***E05C 3/10*** | (2006.01) |
| ***E05C 9/04*** | (2006.01) |
| *E05B 13/10* | (2006.01) |

(52) U.S. Cl.

CPC ............ *E05C 9/041* (2013.01); *E05B 13/101* (2013.01); *E05Y 2201/638* (2013.01); *E05Y 2201/708* (2013.01); *E05Y 2900/20* (2013.01)

(58) Field of Classification Search

CPC ......... Y10T 292/0837; Y10T 292/0838; Y10T 292/084; Y10T 292/0841; Y10T 292/0845; Y10T 292/0844; Y10T 292/0969; Y10T 292/097; Y10T 292/0971; Y10T 292/0972; Y10T 292/0977; Y10T 292/0992; Y10T 292/0994; Y10T 292/0995; Y10T 292/1014; Y10T 292/1016; Y10T 292/1017; Y10T 292/102; Y10S 292/11; Y10S 292/27; Y10S 292/48

See application file for complete search history.

(56) References Cited

U.S. PATENT DOCUMENTS

| | | | | |
|---|---|---|---|---|
| 6,068,308 | A * | 5/2000 | Molzer | E05B 63/0056 292/336.3 |
| 6,178,795 | B1 | 1/2001 | Hsueh | |
| 6,708,537 | B1 | 3/2004 | Eschweiler et al. | |
| 2001/0030429 | A1* | 10/2001 | Yen | E05B 1/0038 292/207 |
| 2003/0019256 | A1 | 1/2003 | Frolov | |
| 2003/0159478 | A1* | 8/2003 | Nagy | E05C 9/041 70/107 |
| 2004/0189012 | A1* | 9/2004 | Katou | E05B 83/30 292/34 |
| 2007/0000293 | A1 | 1/2007 | Daniels et al. | |
| 2016/0340931 | A1* | 11/2016 | Huang | E05B 13/10 |
| 2019/0234120 | A1* | 8/2019 | Flaute | B60R 7/06 |

* cited by examiner

LOCKABLE HANDLE ASSEMBLY WITH FLOATING CAM MECHANISM

PRIOR APPLICATION

In accordance with 37 C.F.R. 1.76, a claim of priority is included in an Application Data Sheet filed concurrently herewith. Accordingly, the present application claims priority from Australian Provisional Patent Application Number 2018903093, entitled "HANDLE ASSEMBLY", filed Aug. 23, 2018, the contents of which is hereby included in its entirety.

TECHNICAL FIELD

The present invention generally relates to a handle assembly for a drawer, cabinet or other similar item.

BACKGROUND

Drawers with devices for releasably locking the drawer in a closed position are known for use in various applications. For example, a lock barrel may be provided whereby when locked the drawer is prevented from opening, or a key is inserted and turned to release the drawer so that it is free to be opened. Other examples may have a latch that prevents the drawer from falling open, but wherein the retention of the latch can be overcome and the drawer opened simply by providing sufficient force to open the drawer.

It may be desirable, however, to allow the drawer to be locked closed but opened without the use of a key. It may also be desirable to provide a system whereby the drawer can be held closed and opened without a key, but also lockable in other circumstances so that a key is required for security purposes. Such a drawer would ideally be ergonomic and easily opened, but simultaneously secure when locked.

Similar issues as described above also apply to other items, such as cabinets or cupboards, for example. The present invention seeks to provide a handle assembly that can be used with a drawer or other item to address the above and/or other problems or drawbacks of the prior art.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

According to one example aspect, there is provided a handle assembly, including a body and a handle, the handle being rotatably mounted to the body and operatively connected to a cam such that rotation of the handle causes corresponding rotation of the cam, the cam being movable between an activated position and a deactivated position, wherein: when the cam is in the activated position, rotation of the handle causes the cam to rotate and engage a retention device; and when the cam is in the deactivated position, rotation of the handle causes the cam to rotate without engaging the retention device.

In one example form, the cam has a rotation axis about which the cam rotates, and the movement of the cam between the activated position and the deactivated position is achieved by translation of the cam along the rotation axis.

In another example form, the mounting of the handle to the body includes an axle, the cam also being mounted on the axle, and the axle being keyed so that it is rotationally fixed relative to the handle and the cam. Preferably, the cam is moved between the activated and deactivated positions by sliding along the axle.

In another particular, but non-limiting, example form, the handle assembly further includes a locking device, wherein when the locking device is in a locked position, the cam is in the deactivated position.

In one example form, the locking device includes an arm, the arm being movable to selectively engage the cam, wherein the arm engages and moves the cam to the activated position when the locking device is moved to an unlocked position, and the arm releases the cam when the locking device is moved to the locked position. In another example form, the handle assembly includes a biasing element that biases the cam towards the deactivated position.

Preferably, the handle has the same range of motion regardless of the position of the cam.

In another particular, but non-limiting, example form, the retention device includes a first protrusion and a follower, the follower being located proximal to the cam so that, when the cam is in the activated position and the handle is rotated, a face of the cam contacts the follower and urges the follower in a manner that causes the first protrusion to be retracted inwardly.

In one example form, the retention device further includes a second protrusion that is operatively connected to the first protrusion so that the second protrusion is also retracted inwardly when the first protrusion is retracted by the cam. In another example form, the first and second protrusions are connected by a rack and pinion device, such that the first and second protrusions retract inwardly along axes that are substantially aligned with one another.

In one example form, the locking device can be replaced with a blank and the cam fixed in the activated position.

According to another example aspect, there is provided a drawer, including a handle assembly substantially as defined herein.

In one form, rotation of the handle requires application of a force to the handle in substantially the same direction as the drawer moves when being opened. In another form, the retention device extends beyond an edge of the drawer when the retention device is not retracted and the retention device is configured so that it interacts with a drawer housing to hold the drawer in a closed position when the retention device is not retracted.

According to another example aspect, there is provided a door, including a handle assembly substantially as defined herein.

In one form, rotation of the handle requires application of a force to the handle in substantially the same direction as the door moves when being opened. In another form, the retention device extends beyond an edge of the door when the retention device is not retracted and the retention device is configured so that it interacts with a cabinet enclosure to hold the door in a closed position when the retention device is not retracted.

BRIEF DESCRIPTION OF FIGURES

Example embodiments should become apparent from the following description, which is given by way of example only, of at least one preferred but non-limiting embodiment, described in connection with the accompanying figures, wherein.

DETAILED DESCRIPTION

Figure 1:
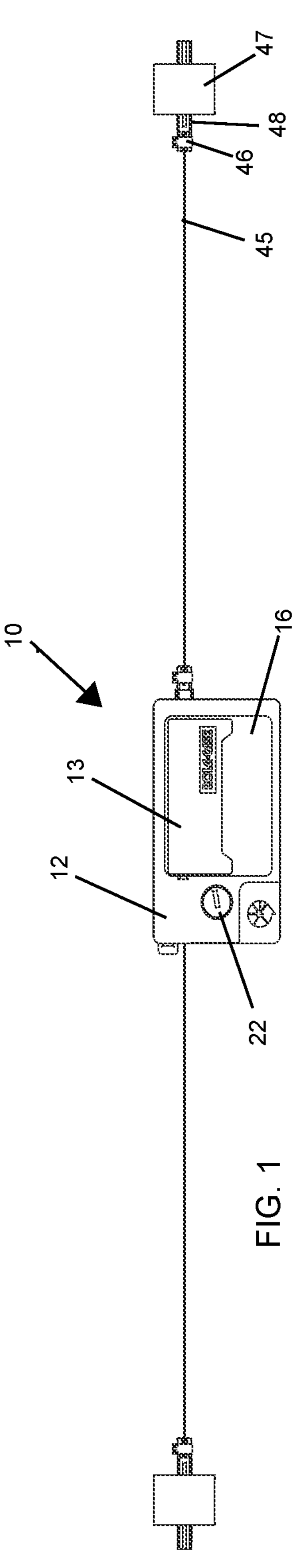
FIG. 1 illustrates a front view of a handle assembly according to an embodiment of the invention.

The following modes, given by way of example only, are described in order to provide a more precise understanding of the subject matter of a preferred embodiment or embodiments.

In the Figures, incorporated to illustrate features of an example embodiment, like reference numerals are used to identify like parts throughout the Figures.

Figure 2:
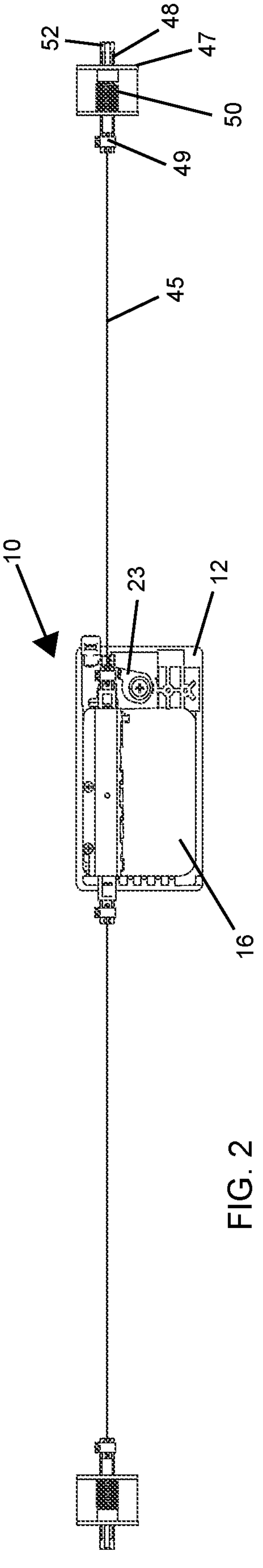
FIG. 2 illustrates a rear view of the handle assembly of FIG. 1.

Referring to FIGS. 1 and 2, a handle assembly 10 according to an embodiment of the invention is shown. The handle assembly 10 includes a body 12 that supports all components of the handle assembly 10. One such component is a handle 13 that is rotatably mounted to the body 12.

Figures 3, 4:
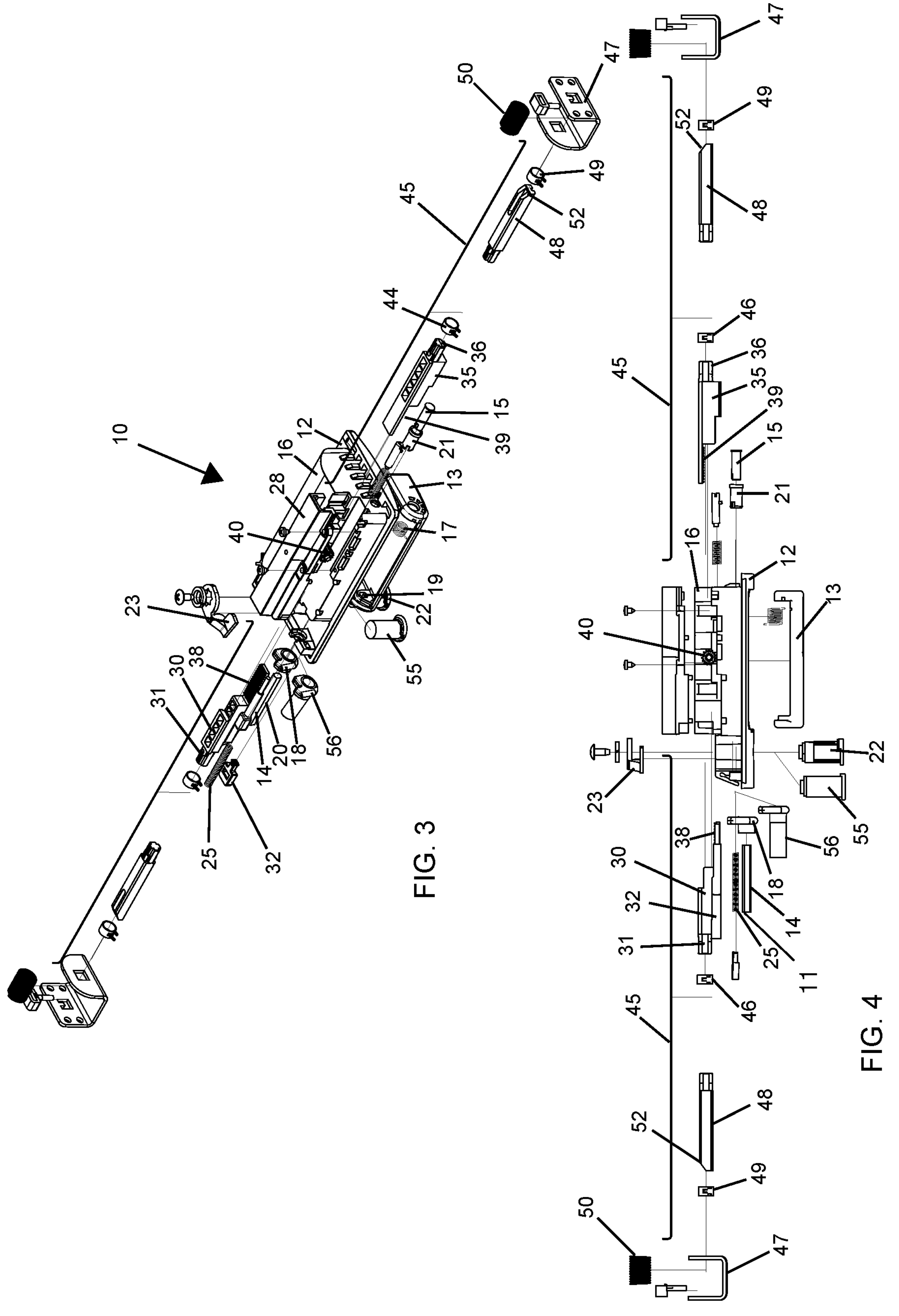
FIG. 3 illustrates an exploded isometric view of the handle assembly of FIG. 1.
FIG. 4 illustrates an exploded top view of the handle assembly of FIG. 1.

Referring to FIG. 3, the handle assembly 10 is shown in a disassembled form for ease of viewing the components of the handle assembly 10. Here it can be seen that the handle 13 is mounted using a hinge pin 14 at one end, and a support pin 15 with support sleeve 21 at the other end.

A recess 16 formed in the body 12 allows the handle 13 to be positioned substantially within the body 12 but to permit access below and behind the handle 13 for simple operation by a user's hand. A handle return spring 17 is fitted to the support sleeve 21, and abuts the body 12 and handle 13 to bias the handle 13 to a position substantially within the recess 16.

In use, the handle 13 can be rotated about a longitudinal axis of the hinge pin 14 and support pin 15 so that the handle 13 is partially removed from the recess 16. When released, the handle return spring 17 then moves the handle 13 back into position within the recess 16.

A cam 18 is fitted to the hinge pin 14 and is able to slide along the hinge pin 14, with the hinge pin 14 being fixed to the handle 13. The cam 18 and a mounting hole 19 in the handle 13 are each keyed to prevent rotation relative to one another. That is, each of the cam 18 and hole 19 have flat surfaces that correspond with flat surfaces 20 on the hinge pin 14 or hinge pin with key 11 (FIG. 4). These flat surfaces operatively connect the cam 18 to the handle 13 so that, even though the cam 18 can slide along the hinge pin 14, the cam 18 cannot rotate independently of the handle 13.

In the preferred embodiment shown, the hinge pin 14 is fixed to the handle 13, with the cam 18 free to slide along the hinge pin 14. It will be appreciated, however, that alternative embodiments may have the cam 18 fixed to the hinge pin 14, with the hinge pin 14 free to slide within the hole 19 of the handle 13.

Figure 7:
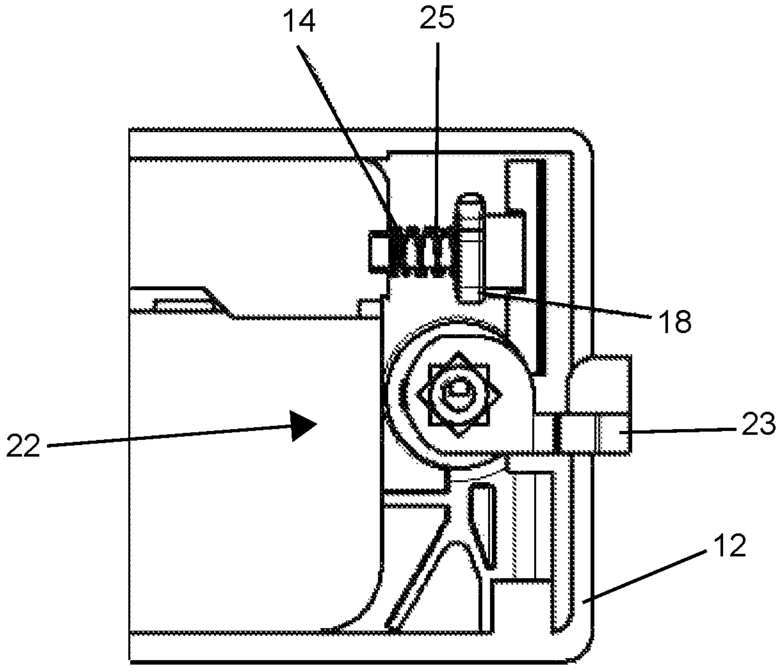
FIG. 7 illustrates a rear view of the handle assembly of FIG. 1, where the handle assembly is in a locked position.
Figure 8:
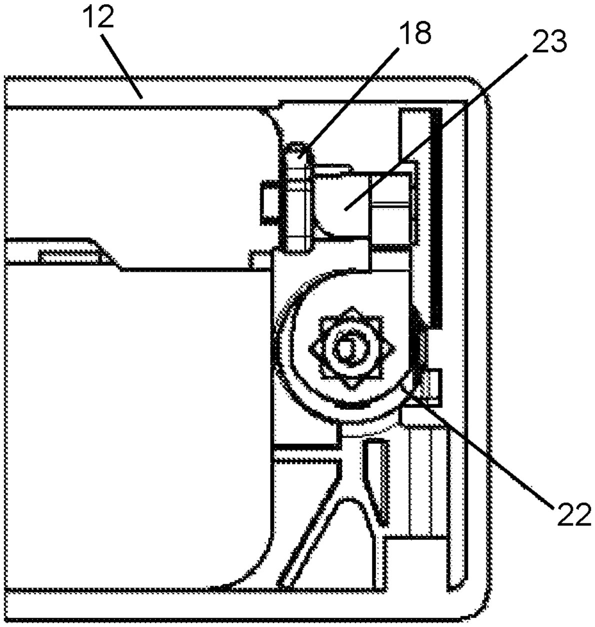
FIG. 8 illustrates a rear view of the handle assembly of FIG. 1, where the handle assembly in an unlocked position.

Referring now to FIGS. 7 and 8, the cam 18 can be moved between an activated position and a deactivated position by sliding along the hinge pin 14. FIG. 7 shows the cam 18 in the deactivated position while FIG. 8 shows the cam 18 in the activated position.

Referring to FIG. 7, a locking device 22 with a tab or arm 23 is shown in a locked position. In this position, the arm 23 extends outwardly towards the side of the body 12, separated from the cam 18. The cam 18 is biased by a spring 25 in a direction away from the handle 13 along the hinge pin 14. This position of the cam 18 away from the handle 13 is the deactivated position, as the arm 23 has moved away, releasing the cam 18.

Referring now to FIG. 8, the locking device 22 is shown in an unlocked position. In this position, the arm 23 is rotated so that it contacts the cam 18, forcing the cam 18 to slide along the hinge pin 14 towards the handle 13, against the force of the spring 25. This position of the cam 18 close to the handle 13 is the activated position.

Referring back again to FIG. 3, rotation of the handle 13 causes rotation of the hinge pin 14 and the cam 18. When the cam 18 is in the activated position, this rotation of the cam 18 actuates a retention device 28, whereas when the cam 18 is in the deactivated position, the cam 18 still rotates but does not contact, and therefore does not actuate, the retention device 28.

Figure 5:
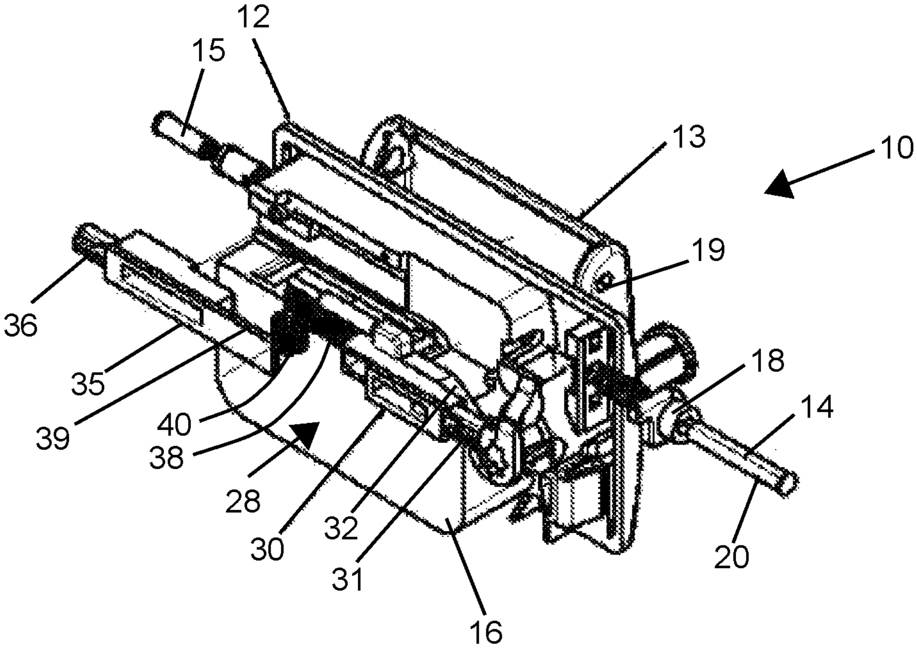
FIG. 5 illustrates an exploded isometric view of the handle assembly of FIG. 1.
Figure 6:
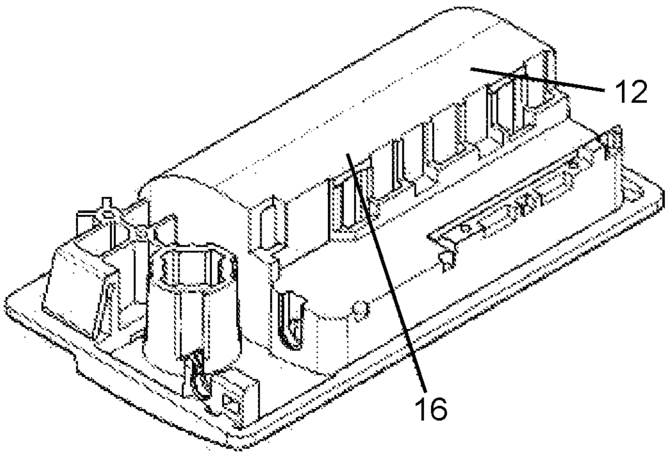
FIG. 6 illustrates an isometric view of a body from the handle assembly of FIG. 1.

The retention device 28 has a first component 30 with a first protrusion 31 that extends towards the outside of the body 12. The first component 30 also has a follower 32 that is located proximal to the cam 18. The follower 32 is in the form of a slanted surface, and can be seen more clearly in FIG. 5.

When the cam 18 is in the activated position and the handle 13 is rotated, a face of the cam 18 contacts the follower 32. As the cam 18 continues to rotate, it urges the follower 32 in a manner that causes the first protrusion 31 to be retracted inwardly towards the body 12. That is, the first component 30 moves inwardly as the cam 18 slides along the follower 32.

When the cam 18 is in the deactivated position, however, it is free to rotate with the handle 13 and does not contact the follower 32 at any point during that rotation.

The retention device 28 also has a second component 35 with a second protrusion 36. The second component 35 is connected to the first component 30 by a rack and pinion device. The device includes a first rack 38 on the first component 30 and a second rack 39 on the second component 35. The two racks 38, 39 are connected by a pinion 40 rotatably fixed in position between the two racks 38, 39.

The rack and pinion device thereby causes the second component 35 to also be retracted inwardly towards the body 12, albeit in the opposite direction to the first component 30, when the first component 30 is retracted by the cam 18.

The first component 30 and/or second component 35 are biased towards their outer positions, so that they return to this position when the handle is released. This bias force is provided by the spring 42.

Because the cam 18 does not contact the follower 32 when it is in a deactivated position, there is nothing preventing the handle 13 from having at least the same degree of rotation when the locking device 22 is in the locked position. This rotation of the handle 13 just occurs without the retention device 28 being retracted. That is, the handle 13 has the same range of motion regardless of the position of the locking device 22.

The handle assembly 10 is designed so that it can be fitted to a drawer. The first protrusion 31 and second protrusion 36 are each connected to a rod or wire 45 and held in place by a clamp 46. At an outer edge of the drawer, a bracket 47 is fixed to the drawer and supports a latch 48 that is connected to the outer end of the wire 45 by a clamp 49. A spring 50 biases the latch 48 towards the outside of the drawer.

The latch 48 has a slanted surface 52 that extends beyond the outer side of the bracket 47. This end of the latch 48 is designed to interact with part of the drawer housing to hold the drawer in the closed position. The slanted surface 52 contacts the housing as the drawer is closed, forcing the latch 48 inwardly. Once the latch 48 passes a particular point, it can extend outwardly again behind the housing, holding the drawer closed. Only when the handle assembly 10 is operated (when unlocked) to pull the latch 48 inwardly can the drawer be opened.

When locked, rotation of the handle 13 is decoupled from the retention device 28 and therefore the devices extending to the sides of the drawer, including the wire 45 and latch 48. Therefore, rotation of the handle 13 is still possible, however it does not release the drawer. When the handle assembly 10 is unlocked, it is still held closed and cannot fall open, for example, but can be opened through actuation of the handle 13.

While the embodiment described includes a wire 45 to extend outwardly from the handle assembly 10, it will be appreciated that alternative components could be used, such as other forms of tether, or solid connections such as a bar or rod. Further, it will be appreciated that depending on the specific components, some of the springs in either the handle assembly 10 and/or near the sides of the drawer could be deleted, while still allowing the device to function as required.

In the preferred embodiment shown in the figures, the arm 23 does not actively lock the drawer in a closed position, but rather it decouples the handle 13 from the retention device 28. In an alternative embodiment, however, this may be possible. That is, the arm 23 may be connected to a device that interacts with the drawer housing, so that when in the locked position the drawer is held closed. This would simply be a backup device and is not essential to the invention.

Due to the configuration of the handle assembly 10 when installed in a front face of the drawer, rotation of the handle 13 requires application of a force to the handle 13 in substantially the same direction as the drawer moves when being opened. This allows releasing of the drawer and opening of the drawer to be achieved with a single motion.

The handle assembly 10 may also be fitted to a range of other items, such as cupboards or cabinets, for example. It will be appreciated, however, that an alternative embodiment of handle assembly may be used on doors, as only a single protrusion may be required, with the second protrusion and the rack and pinion device being removed. In yet another embodiment, the handle assembly 10 may be mounted to the door at an angle with retention devices at the top and bottom of the door.

The locking device 22 in the preferred embodiment is a simple locking barrel that is operated by a key, as is well known in the art. In alternative embodiments however, it is anticipated that many alternative solutions are possible. For example, a micro switch, Bluetooth connectivity or other wireless communication means may be incorporated into the lock operation.

Similarly, other features such as an LED or other similar display to indicate an open lock position could be incorporated, with or without a low battery alarm. Remote connectivity could not only indicate the position of the locking device, but could also allow remote lock operation. The locking device could also communicate with other sensors to provide an alarm or remote notification for unauthorised entry.

In one embodiment, there may be an option provided of replacing the locking device 22 and arm 23 with a blank 55, which is also shown in FIGS. 3 and 4. The blank 55 simply fills the space previously used by the locking device 22, but does not have any other function. Meanwhile, when the blank 55 is used, the cam 18 is also replaced by a fixed cam 56. The fixed cam 56 is much wider, so is not free to slide along the hinge pin 18, thereby staying permanently in the activated position.

The handle assembly 10 is aimed at being a simple, ergonomic and effective design, whereby the rack and pinion actuation can be locked with a key or by other means without restricting the movement of the handle. This is advantageous as it ensures there is no strain placed on the locking mechanism when the rack and pinion actuation is locked.

In a more general sense, a handle assembly in accordance with this invention includes a pull handle that is actuated by the user, causing the rotation of the sliding cam that sits on the handle hinge pin. The sliding cam is able to move horizontally along the handle hinge pin to and from a position where it is able to actuate the rack and pinion mechanism.

The design of the handle assembly is such that when the sliding cam is held in place by the lock arm in the unlocked position, the rotation of the handle ensures the sliding cam actuates the rack and pinion mechanism. When the handle assembly is in the locked position, the lock arm moves away from the sliding cam and no longer holds it in place. As a result, the sliding cam is moved along the handle hinge pin due to the force of a compressive spring. When the sliding cam has moved along the handle hinge pin to the locked position, the position of the sliding cam ensures that it no longer actuates the rack and pinion mechanism as the handle is pulled.

For retaining the handle hinge pin inside the handle and ensuring they rotate together, the handle hinge pin is of a shape and has an interference fit inside the handle. The sliding cam has a tolerance fit matching the shape of the handle hinge pin, allowing it to move horizontally along the shaft when the lock arm moves the sliding cam to the unlocked position or when the lock arm is moved away and the compression spring returns the sliding cam to the locked position. However, the shape of the handle hinge pin ensures that the sliding cam rotates with the handle.

The handle assembly 10 is preferably made primarily from thermoplastics. Certain components, however, preferably use other materials where necessary. In particular, the hinge pin 14 is made from steel, as this component is difficult to mould accurately from plastic and the tension applied during handle rotation in the unlocked position may result in it twisting if made from plastic. Similarly, the arm 23 of the locking device 22 is preferably also made from steel.

Various other embodiments may use other materials or combinations of materials, which are also considered to fall within the scope of the invention. For example, aluminium or steel may be used for various other components, or other materials may be used for certain components, such as but not limited to other metals and/or composite materials.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as “front” and “rear”, “inner” and “outer”, “above” and “below” and the like are used as words of convenience to provide reference points and are not to be construed as limiting terms.

Whilst the present invention has been described with reference to particular embodiments, it will be understood that many modifications will be apparent to those skilled in the art. All such variations and modifications should be considered to fall within the scope of the invention as broadly described and as claimed below.

Throughout this specification and the claims which follow, unless the context requires otherwise, the word “comprise”, and variations such as “comprises” or “comprising”, will be understood to imply the inclusion of a stated integer or step or group of integers or steps but not the exclusion of any other integer or step or group of integers or steps.

LIST OF PARTS

| | |
|---|---|
| 10 | handle assembly |
| 12 | body |
| 13 | handle |
| 14 | hinge pin |
| 15 | support pin |
| 16 | recess in body |
| 17 | handle return spring |
| 18 | cam |
| 19 | mounting hole |
| 20 | flat surface |
| 21 | support pin sleeve |
| 22 | locking device |
| 23 | arm |
| 25 | cam spring |
| 28 | retention device |
| 30 | first component |
| 31 | first protrusion |
| 32 | follower |
| 35 | second component |
| 36 | second protrusion |
| 38 | first rack |
| 39 | second rack |
| 40 | pinion |
| 42 | spring for rack and pinion |
| 45 | wire |
| 46 | clamp |
| 47 | bracket |
| 48 | latch |
| 49 | latch clamp |
| 50 | latch return spring |
| 52 | slanted end of latch |
| 55 | blank |
| 56 | fixed cam |

What is claimed is:

1. A handle assembly, comprising a body and a handle secured to a closure, the handle being rotatably mounted to the body and operatively connected to a cam such that rotation of the handle causes corresponding rotation of the cam, the cam being movable between an activated position for opening the closure and a deactivated position wherein the closure is not opened, wherein: the mounting of the handle to the body comprises an axle, the cam being slidably mounted for movement axially along the axle, the cam and axle being directly engaged with each other, the handle and cam including key surfaces causing them to rotate together around a longitudinal axis of the axle, the cam having a cam face on a side surface of the cam, the cam face extending at least partially around the longitudinal axis and constructed and arranged to convert rotation of the axle around the longitudinal axis into linear motion of a follower member when in contact therewith to retract at least one retention device; a locking device, the locking device including an arm, the arm selectively moveable to engage the cam to move the cam along the axle between the activated position, wherein the locking device positions the cam to interact with the follower member allowing the cam rotation to cause retraction of the at least one retention device allowing the closure to be opened and the deactivated position wherein the locking device allows the cam to slide along the axle such that the cam rotates without engaging the follower member and without moving the at least one retention device wherein opening the closure is prevented.

2. The handle assembly according to claim 1, wherein the axle includes a key extending longitudinally along the axle, and wherein the key surfaces of the cam includes a keyway sized and shaped to cooperate with the key so that the cam is rotationally fixed relative to the handle.

3. The handle assembly according to claim 1, further comprising a biasing element that biases the cam to slide along the axle to the deactivated position.

4. The handle assembly according to claim 1, wherein the handle has the same range of motion regardless of the position of the cam.

5. The handle assembly according to claim 1, wherein the at least one retention device comprises a first protrusion and the follower, the follower being located proximal to the cam face so that, when the cam is in the activated position and the handle is rotated, the cam face contacts the follower as it rotates about the longitudinal axis and causes the first protrusion to be retracted inwardly.

6. The handle assembly according to claim 5, wherein the at least one: retention device further comprises a second protrusion that is operatively connected to the first protrusion so that the second protrusion is also retracted inwardly when the first protrusion is retracted by the cam.

7. The handle assembly according to claim 6, wherein the first and second protrusions are connected by a rack and pinion device, such that the first and second protrusions retract inwardly along axes that are substantially aligned with one another.

8. The handle assembly according to claim 1 wherein the handle assembly is secured to closure is a drawer.

9. The handle assembly according to claim 8, wherein rotation of the handle requires application of a force to the handle in substantially the same direction as the drawer moves when being opened.

10. The handle assembly according to claim 8, wherein the at least one retention device extends beyond an edge of the drawer when the at least one retention device is not retracted and the at least one retention device is configured so that it interacts with a drawer housing to hold the drawer in a closed position when the at least one retention device is not retracted.

11. The handle assembly according to claim 1 wherein the closure is a door.

12. The handle assembly according to claim 11, wherein rotation of the handle requires application of a force to the handle in substantially the same direction as the door moves when being opened.

13. The handle assembly according to claim 11, wherein the at least one retention device extends beyond an edge of the door when the retention device is not retracted and the at least one retention device is configured so that it interacts with a cabinet enclosure to hold the door in a closed position when the at least one retention device is not retracted.

* * * * *